Aug. 20, 1968   G. S. YOUNG ETAL   3,398,368
METER APPARATUS HAVING LOGARITHMIC RESPONSE TO CURRENT
AND A LINEAR RESPONSE TO TEMPERATURE
Filed May 8, 1962   6 Sheets-Sheet 1

INVENTORS.
Glenn S. Young
Arthur Laudel, Jr.
BY
Scofield, Kokjer, Scofield & Lowe
ATTORNEYS.

INVENTORS.
Glenn S. Young
BY Arthur Laudel, Jr.
Scofield, Kokjer, Scofield & Lowe
ATTORNEYS.

Aug. 20, 1968  G. S. YOUNG ETAL  3,398,368
METER APPARATUS HAVING LOGARITHMIC RESPONSE TO CURRENT
AND A LINEAR RESPONSE TO TEMPERATURE
Filed May 8, 1962  6 Sheets-Sheet 5
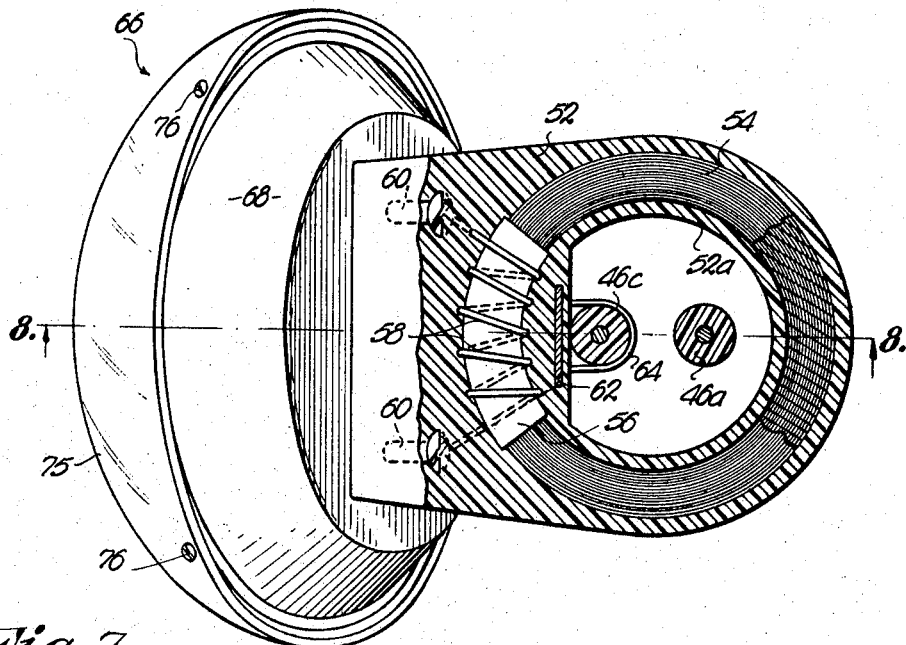
Fig. 7.
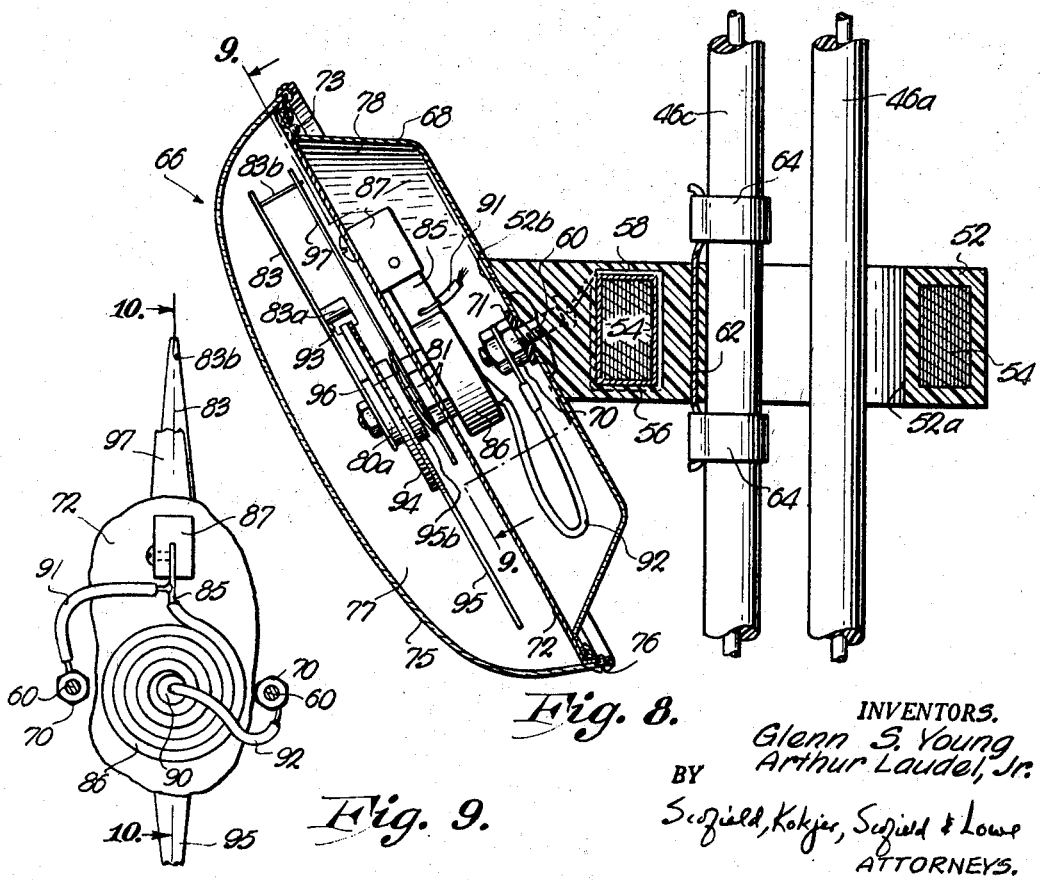
Fig. 8.
Fig. 9.
INVENTORS.
Glenn S. Young
Arthur Laudel, Jr.
BY
Scofield, Kokjer, Scofield & Lowe
ATTORNEYS.

INVENTORS.
Glenn S. Young
Arthur Laudel, Jr.
BY Scofield, Kokjer, Scofield & Lowe
ATTORNEYS.

United States Patent Office 3,398,368
Patented Aug. 20, 1968

3,398,368
METER APPARATUS HAVING LOGARITHMIC
RESPONSE TO CURRENT AND A LINEAR
RESPONSE TO TEMPERATURE
Glenn S. Young, Shawnee Mission, and Arthur Laudel,
Jr., Leawood, Kans., assignors to Power Monitors, Inc.,
Kansas City, Mo., a corporation of Missouri
Filed May 8, 1962, Ser. No. 193,153
18 Claims. (Cl. 324—104)

The present invention relates in general to electrical apparatus, and it deals more particularly with the art of measuring electrical quantities.

Broadly speaking it is the object of the invention to provide improved apparatus for measuring the effective loading of an electric circuit or of equipment connected in said circuit.

When the load on a transformer, motor, generator or other piece of electric equipment is considered in an absolute sense, it ordinarily involves measuring the actual value of the load current fed to or from the equipment in question. In the last analysis, however, those concerned with the equipment often have more reason to view loading in a relative sense, that is to say, in terms of whether the equipment in question is fully loaded, partially loaded or overloaded.

Considered in the latter light, loading is not gauged solely on the basis of absolute measured load, but on the basis of the equipment's load-carrying capability, as well; it is in the nature of a mathematical relationship, rather than an absolute measured quantity—a relationship usually expressed in terms of the fraction or percentage of the equipment's load-carrying capability that is represented by the measurable ampere load current. Determination of this relationship usually is directly or indirectly involved in most loading problems encountered in actual practice. With this in mind, one of our objectives is to eliminate the need for computing the relationship, and a feature of our invention resides in the provision of a practical and reliable direct-reading instrument which accomplishes this.

Now, the load-handling capability of a given piece of electrical equipment may be regarded as its rated capacity, or "name plate rating," if the equipment is operated under particular conditions specified by the manufacturer. By choice or out of necessity, however, actual operating conditions often differ considerably from those specified in connection with the rating, with the result that the actual load-handling capability may be either greater or smaller than the so-called rated capacity of the equipment in question. It is well recognized in the electrical art that name-plating ratings are only rough guides, and must be "adjusted" or "corrected" to fit actual operating conditions if greater accuracy is desired. Many manufacturers publish correction factors or charts to aid in accomplishing this.

The same general considerations obtain with respect to electrical equipment which does not carry an arbitrary manufacturer's rating. Whether rated or not, in other words, the inherent load-handling capability of most electrical equipment will vary—often very significantly—with changes in operating conditions or environment.

Remembering that we are here primarily concerned with registering the relative loading of equipment, that is to say the degree to which the equipment's load capability is taxed by the actual load being carried, it will readily be appreciated that this can be affected quite as much by a change in capability as by a change in the actual ampere loading. Thus, if fully loaded equipment enjoys a doubling of its capability due to changed operating conditions, it is no longer fully loaded but only half loaded; conversely, equipment operating at half load may advance into overloaded condition as a result of increased ampere loading, or as a result of a change of operating conditions that decreases the load-carrying capability, or both.

An important object of the invention, then, is to measure or sense changes in operating conditions that affect capability, as well as sensing changes in the absolute value of electrical loading of the equipment in question, and to utilize these two factors jointly in controlling the response of the registering device or element. A related feature resides in registering, in terms of percentage or otherwise, the proportion of the true load capability being utilized under varying conditions of loading and concurrently varying conditions of capability.

Achieving these ends requires integrating the effect of independently varying quantities, and one of our objectives is to provide improved apparatus for accomplishing this. An important feature of the invention is the provision of a novel electro-mechanical transducer, and more particularly one which is capable of handling the desired integration of quantities very simply and effectively. A further feature resides in integrating both electrical and nonelectrical variables by means of this apparatus, to produce a unitary response controlled jointly by both.

In the case of motors, generators, transformers and most other electrical equipment, load-carrying capability is limited chiefly by the effect of elevated temperatures on the insulation material employed in the equipment. The limit of the ability of the insulation material to retain its insulating properties and to hold the effects of aging to a predictable allowable life, in other words, usually dictates the maximum safe operating temperature. It is when this temperature limit is exceeded that the equipment enters the region of overloaded operation.

With a relatively high ambient temperature the aforementioned safe temperature limit obviously will be reached with a smaller temperature rise than if the ambient temperature rise than if the ambient temperature is low. The larger the allowable temperature rise, the larger will be the load-carrying capability of the equipment in question. It is for this reason that capability generally increases with a drop in ambient temperature and decreases as ambient temperature rises.

Variation of ambient temperature is commonly recognized as the most important single factor affecting capability. This is taken into consideration in the present invention, and a salient feature resides in automatically registering the proportion of the temperature-corrected capability being utilized. A further feature resides in doing this on a continuous basis.

Another object of the invention is to provide apparatus for indicating or otherwise registering not only the proportion of the load capability presently being utilized, but also the past history of loading, in terms of the largest proportion utilized on any prior occasion and/or the number of prior times said proportion has exceeded a predetermined value.

A further objective is to provide electric load-measuring apparatus which is inductively coupled with the circuit whose load is to be measured, and which has a novel nonlinear response to variations in the load current. In connection with this, a significant feature resides in the use of a saturable current transformer as the inductive coupling element. Another related feature involves the utilization of a thermo-mechanical transducer resistively heated by the output of the current transformer to effect still a further modification of the response characteristic of our apparatus.

It also is an object of the invention to provide electrical load-measuring apparatus of the foregoing character which is not subject to injury or damage from abnormally high current levels in the circuit being measured; and whose operation inherently is relatively unaffected by load variations of transient or brief nature, whereby auxiliary damping mechanisms are not needed in order to obtain stability of operation.

Still another object is to provide apparatus of the kind indicated, which is capable of load measurement over a wide range of values, without undue crowding in the portion of the range where small increments of change are most likely to be significant.

Other objects of the invention, together with features of novelty whereby the objects are achieved, will appear in the course of the following description.

In the drawings which form a part of the specification and are to be read in conjunction therewith and in which like reference numerals refer to like parts of the various views:

FIG. 7 is a plan view of said device, parts being broken away shown in cross section for purposes of illustration;

FIG. 8 is a cross-sectional view taken along the line 8—8 of FIG. 7 in the direction of the arrows;

FIG. 9 is a fragmentary sectional elevation taken along the line 9—9 of FIG. 8 in the direction of the arrows;

Figure 1:
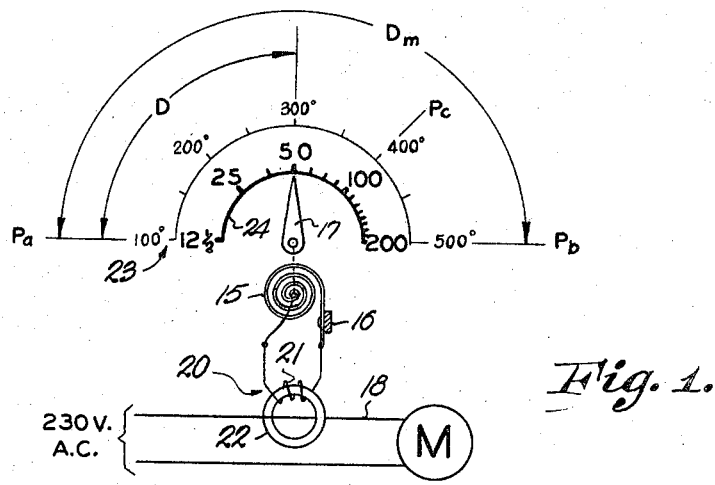
FIG. 1 is a schematic illustration of an elementary form of our invention.

It will be helpful in understanding the general nature of the invention to refer first to FIG. 1, where the basic components of our measuring apparatus are shown schematically in association with an alternating current motor M which receives power from a suitable source of fixed voltage, for example a 230 v. alternating current power supply line.

For present purposes it will be convenient to assume the motor M operates continuously but under a fluctuating load, whereby the load current drawn by it varies correspondingly. Further let it be assumed that the motor is in an outdoor location where it is subject to very substantial swings of ambient temperature in the course of a 24-hour day and where there may be a spread of as much as, say, 150° F., between winter and summer temperature extremes. The lower the ambient temperature, the greater will be the load current that the motor can carry without overheating—or, to put it differently, the greater will be its load-carrying capability.

Now, our apparatus is designed to measure or sense the fluctuating value of the load current drawn by motor M and to provide a continuous indication of the magnitude thereof, expressed as a percentage of the motor's load-carrying capability. In this way, the degree to which its capability is taxed by the load imposed on the motor at any given time can be ascertained at a glance.

Our instrument has a spiral bimetal coil 15 whose outer end is anchored at 16 and whose inner end is connected to a rotary shaft carrying a pointer 17. Thus the temperature of the bimetal always is reflected by the angular position of the pointer relative to its associated dial, any increase in the bimetal temperature serving to advance the pointer clockwise by an amount proportional to the increase, while any temperature decrease produces a corresponding shift of the pointer in a counterclockwise direction.

Bimetal 15 is exposed to the ambient air in the same general vicinity as motor M, whereby any change in the ambient temperature affecting the load-carrying capability of the motor will also affect the bimetal. Were we to stop here, we would merely have, in effect, a thermometer suitable for measuring ambient temperature. However, just as the internal operating temperature of the motor M is elevated above ambient temperature due to the load carried by it, so also do we provide means for artificially elevating the temperature of bimetal 15 above ambient in accordance with the magnitude of this electrical load.

To accomplish this, the load current in conductor 18 is sensed by a current transformer 20 whose secondary or output winding 21 is inductively coupled with the conductor by the annular core 22 of the transformer. The variable voltage induced in the output winding 21 is impressed on an electrical resistance element to produce a flow of heating current therethrough, and the heat thus generated is utilized to elevate the temperature of the bimetal. While this electrical heater can be a separate element so positioned with reference to the bimetal as to properly transfer its heat to the latter, we prefer to use the bimetal strip as its own heater; in other words, taking advantage of the electrical resistance of the coiled bimetal strip between its inner and outer ends, we connect the output winding of the current transformer thereto as shown, so that the heating current traverses the length of the strip and heats the bimetal internally. In doing this we also find it very desirable in most instances to encase the bimetal strip throughout substantially its full length in a flexible sleeve of woven fiberglas insulation (not shown) which serves to electrically insulate adjacent turns of the coil from one another and also, by reducing the rate of heat radiation, causes the internally generated heat to produce a bimetal temperature rise that varies in essentially linear relation to the amount of heat generated in the strip.

Associated with pointer 17 in FIG. 1, we have shown two scales, 23 and 24. The temperature of bimetal 15 at any given time can be read on the outer scale 23, this being calibrated in degrees Fahrenheit. The temperature reading on this scale (e.g., 300° F. when the pointer is positioned as shown) always will comprise the sum of $$T + T' \qquad (1)$$

where T is ambient temperature and T' is the amount by which the bimetal is elevated above ambient due to the current flow in conductor 18. In actual practice it rarely is necessary or even useful to know any of these temperatures; therefore, while scale 23 is included here to aid in understanding the invention and will be referred to further hereinafter, it ordinarily can be omitted in commercial versions of our device.

In the ensuing discussion it will be convenient to designate the instantaneous ampere value of the load current flowing in conductor 18 as I. Also, let $I_c$ be understood as referring to the ampere value of the load current which motor M is capable of carrying at any given time without overheating, that is to say without exceeding an internal operating temperature which may be regarded as safe in terms of its effect upon electrical insulation and/or other elements that would be susceptible to damage or too rapid deterioration if subjected to more elevated temperatures.

If the motor has been fairly and properly rated by the manufacturer, its full load name-plate rating should, of course, coincide with $I_c$ at the ambient temperature specified by the manufacturer. Whereas its rated load current is a fixed value, however, $I_c$ is variable as will be understood from the fact that, within limits, the lower the ambient temperature the greater will be the load current that the equipment can carry without overheating. In a manner of speaking, then, $I_c$ can be regarded as a temperature-corrected value of the motor's load rating.

The proportion of the motor's load-carrying capability $I_c$ which, at any given time, as being utilized by the load current I actually carried is of very obvious significance in practice, and conveniently can be referred to herein as its effective loading. Mathematically, effective loading can be expressed as the ratio $$I/I_c \qquad (2)$$

and it can be said that the motor is operating below full load capability if this ratio is less than unity, or that it is overloaded if the ratio exceeds unity.

Now, the inner scale 24 associated with pointer 17 of our instrument is calibrated to provide a direct reading of this ratio, expressed as a percentage. A mere glance at scale 24 thus will reveal whether motor M is fully loaded (signified by a percentage reading of "100") and, if not, to what degree the motor is underloaded or overloaded. For example, when the pointer is positioned opposite the 50 percent reading as shown, it can be said immediately that the load current carried by the motor amounts to half the load capable of being carried safely at the time in question. The need for making separate measurements of the absolute value of the load current I and of the ambient temperature T thus is obviated, along with the attendant computations that formerly were required in order to determine effective loading.

Attention should perhaps be directed to the fact that while uniform increments of change in the temperature of bimetal 15 always produce essentially equal increments of movement of the pointer 17, as reflected by the equal divisions and uniform numerical progression of the temperature scale 23, scale 24 which reflects effective loading is laid out on a logarithmic basis. This stems from a very important feature of our invention which it will be well to consider at this point.

Figure 3:
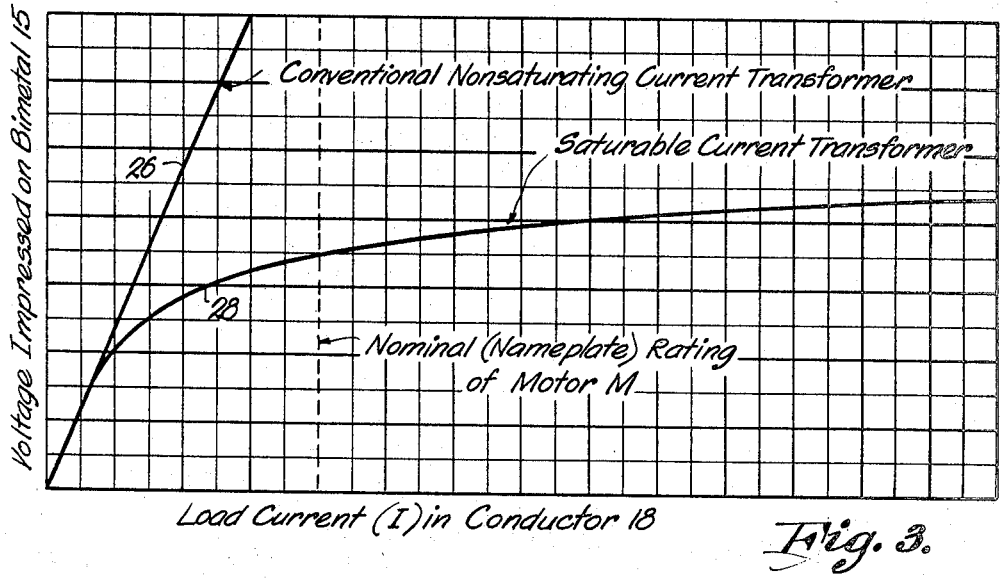
Figure 4:
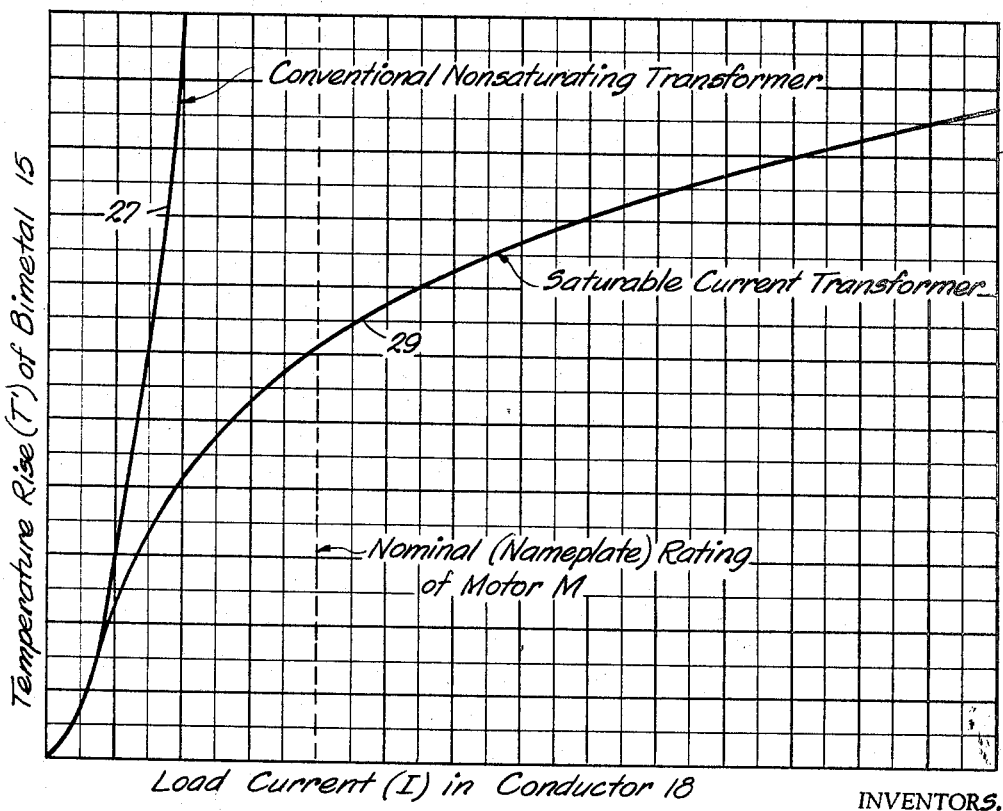

The matter can best be approached with reference to the curves shown in FIGS. 3 and 4. To begin with, let it be assumed for a moment that the current transformer 20 is of conventional design and that the load current I flowing in conductor 18 therefore causes the output winding 21 to impress on bimetal 15 a voltage whose value is essentially a linear function of the load current I as shown by curve 26 (FIG. 3). The heating current produced in the bimetal as the result of this voltage will artificially elevate the temperature of the bimetal by an amount (T') which varies approximately as the square of the applied voltage. Consequently the bimetal's temperature rise (T') above ambient will vary with the load current I flowing in conductor 18 substantially in the manner illustrated by curve 27 (FIG. 4), the relationship plainly being of exponential character. This is totally unsuitable for the present invention and curves 26 and 27 have been included here only for comparison with the results we obtain.

Instead of employing a current transformer of conventional design, a salient feature of the invention resides in our use of the current transformer 20 whose core 22 is deliberately and carefully designed so as to be saturable within the range of electrical loads to be measured, resulting in a nonlinear output voltage characteristic of the kind shown in curve 28 (FIG. 3) and producing a bimetal temperature rise characteristic generally like that shown by curve 29 (FIG. 4). In marked contrast with curve 27, the artificially induced temperature rise T' preferably varies as a logarithmic function of the load current I, according to our invention.

Expressing the relationship mathematically, we have found that the purposes of the invention will best be served when $$T' = a \log I \qquad (3)$$

$a$ being a constant. The total actual temperature of bimetal 15, that is to say the temperature which will be reflected by reading the temperature scale 23 of our instrument, then can be expressed as $$a \log I + T \qquad (4)$$

where T is ambient temperature.

Referring to FIG. 1 let it be assumed that without any change in the value of the load current I flowing in conductor 18, there is a 100° rise in ambient temperature; this will increase the temperature of the bimetal by 100° with the result that pointer 17 will advance 45° in a clockwise direction. Such will be the case, of course, regardless of the starting position of the pointer. Similarly, whatever position pointer 17 occupies, if there is a 100° drop in ambient temperature, the resultant cooling of bimetal 15 will shift the pointer 45° in a counter-clockwise direction. Since a 100° change in the temperature of the bimetal always produces an angular deflection of 45° it will be evident that in the example under consideration here the bimetal has a deflection constant of 0.45.

With ambient temperature remaining constant, if the value of the current flow in conductor 18 increases or decreases sufficiently to produce a 100° increase or decrease in the temperature of the bimetal 15, this, too, quite obviously will shift pointer 17 forty-five degrees but it must always be kept in mind that the temperature (T') of the bimetal which is induced by the load current I is logarithmically related to the latter as shown by curve 29 (FIG. 4) so that if the value of I is relatively high a greater increase therein will be required to produce a 100° rise in the bimetal temperature than would be the case if the value of I were low.

Stated differently, if the load current I increases in uniform small increments from a low value to a high value, the corresponding increments of temperature change of bimetal 15 will become progressively smaller, as indicated by curve 29, and the increments of advance of pointer 17 (FIG. 1) likewise will diminish progressively. Nonetheless, the numerical values which are read on scale 24 for the increments of advance of the pointer will increase in almost direct relation to the increases of current I, due to the logarithmic character of this scale. Its logarithmic character, of course, also has the advantage of "spreading" numerical values at the low end of the scale where small increments of change are more likely to be significant than they are at the high end of the scale.

Now, in any given application, it is important that the response of our instrument be matched or "tailored" to the temperature/capability characteristic of the equipment whose effective loading is to be measured. Putting it another way, since the readings obtained with our instrument are influenced by changes of ambient temperature, as we have already seen, these naturally should reflect as accurately as possible the degree to which the ascending or descending temperature actually affects the load-carrying capability of the equipment under observation, in this case motor M. Due to differences of design and/or other factors, one piece of electrical equipment may be affected more, or may be affected less, than another by a given change in ambient temperature.

Figure 2:
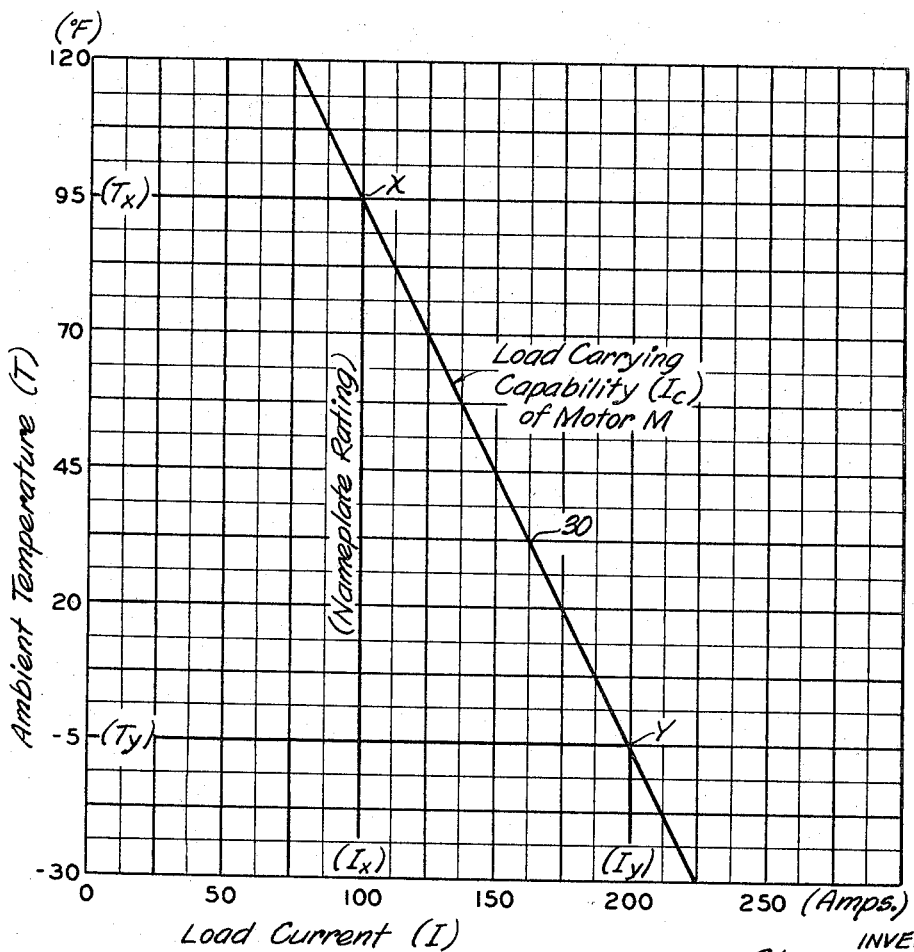
FIGS. 2–5 are graphs showing fundamental thermal, electrical and mechanical relationships involved in the apparatus of FIG. 1, the specific numerical values given being intended only as exemplary or illustrative.

For purposes of discussion, then, let us assume that FIG. 2 shows the temperature/capability characteristic of motor M, line 30 indicating, for different values of ambient temperature, the ampere value of the load current I that the motor can safely carry without oveheating. Every point on this curve thus reflects the full load capability $(I_c)$ of the motor for some particular ambient temperature. As previously noted, the lower the ambient temperature T, the greater the value $I_c$ becomes.

To obtain as close a match as possible between our indicating instrument and the temperature/capability characteristic of the equipment with which it is to be used, it is advantageous to select two arbitrary spaced-apart reference points X and Y on curve 30 as has been done in FIG. 2. With respect to these it can be said, of course, that the equipment in question has a load-carrying capability of $I_x$ when operating at an ambient temperature $T_x$ and that it has a load-carrying capability of $I_y$ when operating at an ambient temperature of $T_y$.

While the selection of points X and Y is a matter of arbitrary choice, we find that if the range of ambient temperatures to be covered is large, as is true in the example under consideration here, it ordinarily is desirable that the points be spaced approximately as shown in FIG. 2 in order to obtain maximum accuracy throughout the entire range. If the range to be covered is smaller, the points can be proportionately closer together. Generally speaking, the closer they are together the greater will be the accuracy of the instrument in the temperature region between points X and Y, but its accuracy for temperatures substantially above or substantially below this region then will be sacrified somewhat.

The exemplary instrument in FIG. 1 has been matched with the temperature/capability characteristic of motor M shown in FIG. 2, using the reference points X and Y as a guide. However, the instrument also is characterized by certain factors that are purely a matter of design choice and which therefore can vary according to the desires of the instrument designer. For example, the full scale range of movement of pointer 17 between the minimum and maximum limits $P_a$ and $P_b$ is 180°, but an instrument having a scale of more (or less) than 180° obviously can be employed. Again, the numerical values chosen for the lower and upper limits of scale 24 are "12½" and "200" respectively in FIG. 1, but a different value can be chosen for either or both limits in designing an instrument for a given application. In view of the variability of these factors, it will be convenient in the ensuing explanation to designate them in general terms as follows:

$D_m$=The number of angular degrees between the upper and lower limits of scale 24 (e.g., 180° in the FIG. 1 instrument).

$R_{min}$=The numerical value of the minimum reading on scale 24 (e.g., "12½" in the FIG. 1 instrument).

$R_{max}$=The numerical value of the maximum reading on scale 24 (e.g., "200" in the FIG. 1 instrument).

Attention previously was called to the fact that bimetal 15 has a deflection constant of 0.45 in the example under consideration. It may now be laid down as a rule that according to our invention it is preferable to employ a bimetal element whose deflection constant is substantially equal to $$\frac{D_m(\log I_y - \log I_x)}{(T_x - T_y)(\log R_{max.} - \log R_{min.})} \quad (5)$$

where the equipment with which our instrument is to be used has a load-carrying capability of $I_x$ at an ambient temperature of $T_x$ and a load-carrying capability of $I_y$ at an ambient temperature $T_y$. (The logarithmic terms in this formula can have any desired base so long as the same base is employed for all logarithmic terms; the same is true of all formulae given herein, except where a particular base is noted.) Substituting in Formula 5 the values derived from FIGS. 1 and 2, it will be seen that the preferred bimetal constant becomes $$\frac{180 (\log 200 - \log 100)}{[95 - (-5)](\log 200 - \log 12.5)} = .45$$

According to the invention, it can further be said that for any given value of load current I flowing in conductor 18 and any given ambient temperature T, the position assumed by pointer 17 under control of bimetal 15 will conform substantially to the formula $$D = A - \frac{D_m}{B}\left[\frac{\log I_x - \log I}{\log I_y - \log I_x} + \frac{T_x - T}{T_x - T_y}\right] \quad (6)$$

where D is the clockwise displacement of pointer 17, in angular degrees, from its left-hand limit position $P_a$; A and B are constants; and the remaining quantities in the formula are the same as previously specified. The two constants A and B may be further particularized as follows:

$A$=The number of angular degrees between $P_a$ and the position of the "100" reading on scale 24 (which amounts to 135° in FIG. 1).

$B = \log_2 R_{max} - \log_2 R_{min}$

Using the limits indicated for scale 24 in FIG. 1, i.e., a minimum reading of 12½ and a maximum of 200, the constant B becomes 4 according to the above formula. Generally speaking, we find that this constant can rarely be below 2 or above 6 in practical applications of our device.

For some purposes it is useful to regard the position of the "100" reading as an index point $P_c$, and to consider the movement of pointer 17 relative to $P_c$ without reference to how far scale 24 extends in either direction from that point. When this is done, the counterclockwise displacement of the pointer from point $P_c$ can be expressed as $$C\left[\frac{\log I_x - \log I}{\log I_y - \log I_x} + \frac{T_x - T}{T_x - T_y}\right] \quad (7)$$

where C is a constant, and negative values of the above expression are indicative of clockwise displacement of the pointer from the point $P_c$.

More often, however, it is of assistance to define the movement of pointer 17 by an alternate formula which we have also verified as closely conforming to the response obtained in practical embodiments of the invention:

$$D = \frac{D_m}{\log R_{max} - \log R_{min}}\left[\log \frac{I}{R_{min}} - \frac{T_x - T}{T_x - T_y} \log \frac{I_x}{I_y}\right] \quad (8)$$

where D is the clockwise angular displacement of the pointer from its left-hand limit position $P_a$, and the other quantities are the same as previously indicated. When our instrument is matched with the temperature/capability characteristic of the motor M on the basis of its load-carrying capability at the selected temperatures $T_x$ and $T_y$ as has been described above, the numerical value of the reading obtained on scale 24 for any value of load current I flowing in conductor 18 and any value of ambient temperature T ideally will be expressed as $$kI\left[\frac{I_x}{I_y}\right]^{\frac{T_x - T}{T_x - T_y}} \quad (9)$$

where k is a constant, and we find in practice that the results obtained by our invention conform closely to this ideal. Unless readings on other than a percentage basis are desired, the constant k in the above formula can have a value equal to the reciprocal of the rated load current of the motor M.

Referring further to the deflection Formulas 6, 7 and 8, above, it will be understood that the load current I and ambient temperature T are the only operational variables therein, all other quantities being fixed in the case of any given installation. By treating all fixed quantities as constants, and by lumping these constants, it can be shown that the movement of pointer 17 according to the invention can be defined in more general terms, the pointer's angular displacement from any given reference position always being substantially equal to $$a \log I + bT - c \quad (10)$$

where $a$, $b$, and $c$ are constants, and where $c$ may sometimes be zero, depending upon the reference position chosen as the starting point from which displacement is to be measured. When ambient temperature also is constant the pointer's displacement from a given position is governed solely by the first term of this formula, namely $a \log I$.

Figure 5:
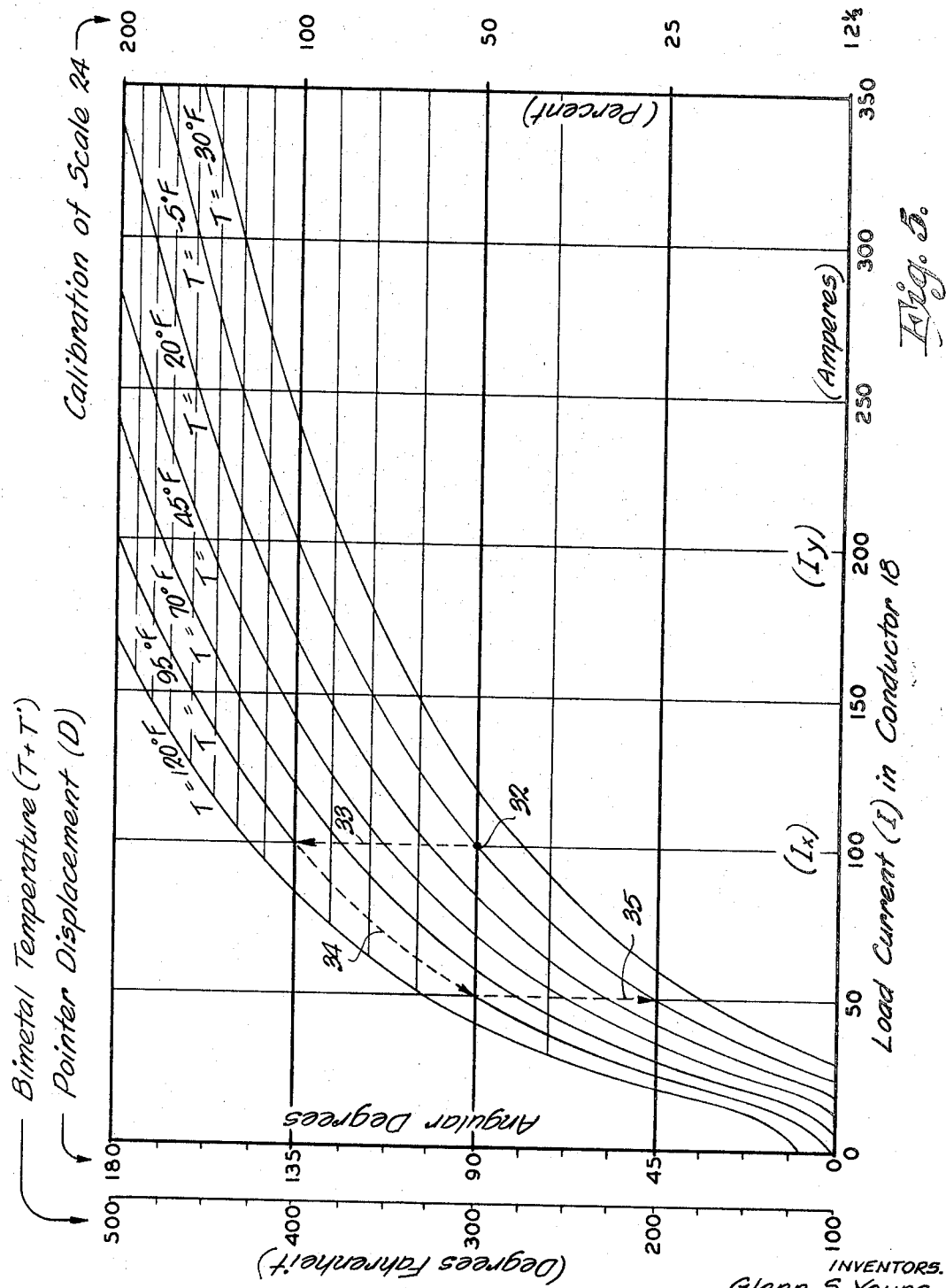

The mathematical relationships which characterize our invention as set forth above are illustrated graphically in FIG. 5 where the numerical values given are the same as those used in connection with FIGS. 1 and 2. As was seen earlier from FIG. 4, the amount of the temperature rise of bimetal 15 above ambient varies as a logarithmic function of the load current I in conductor 18; the curves in FIG. 5, then, show the total temperature of the bimetal for different ambient temperatures T. The latter curves are so chosen as to reflect 25° increments of ambient temperature within the range from −30° F. to 120° F. (the same temperature range as shown in FIG. 2). Except for being vertically displaced above one another as dictated by the difference of ambient temperature, the curves are of identical logarithmic form and conform strictly to Formula 2, as well as to Formulas 6, 7, 8 and 10, given above. The values indicated along the right-hand margin of the graph conform with Formula 9.

Let it be assumed for a moment that motor M is carrying a load of 100 amps. and that the ambient temperature is −5° F., as indicated by point 32 in FIG. 5. Under this condition it will be seen from FIG. 5 that the bimetal temperature is 300° F., the pointer 17 is displaced 90° and, according to the right-hand scale, the effective load reading will be 50 percent. Comparing this with FIG. 1, it can be seen that with a bimetal temperature of 300° F. pointer 17 is indeed displaced 90° clockwise from its left-hand limit and the reading on scale 24 is indeed 50 percent. Referring to FIG. 2 will serve to confirm that although motor M is carrying its full rated load of 100 amps it actually is capable of carrying 200 amps at the low temperature specified, so it is in fact only half loaded, exactly as indicated by our instrument.

Suppose, now, that without any change in the load current I drawn by the motor, ambient temperature rises to 95° F. This change is indicated by the arrow 33 in FIG. 5, from which it will be evident that the temperature of the bimetal now is raised to 400°; as a result, the pointer displacement now is 135° and the effective load reading should be 100 percent. From FIG. 1 it can be seen that when the bimetal temperature is 400° the pointer is displaced 135° clockwise and a reading of 100 percent is obtained. The accuracy of this reading is confirmed by FIG. 2 where, with a load current of 100 amps, and an ambient temperature of 95° F. it is evident that motor M is operating at full capability (point X on curve 30).

While ambient temperature still remains constant at 95° F., let us say that the load current I drops to 50 amps. This is reflected by arrow 34 in FIG. 5. Although the current now is only half the value which obtained at the start (i.e., point 32 in FIG. 5) the temperature of bimetal 15 once more is 300° F.—just as it was at the start—with the result that pointer 17 returns to its 90° angular position indicating 50 percent load. That this is the correct reading will be seen from FIG. 2, for at 95° F., motor M is capable of carrying 100 amps, and therefore is only half loaded by the 50 amp load on it.

As a final illustration, suppose that while the motor continues to operate at a load of 50 amps, ambient temperature drops to −5° F. As indicated by arrow 35 in FIG. 5, the temperature of bimetal 15 now is 200° F., resulting in a pointer displacement of 45° and an effective load reading of 25 percent. That this is the position of pointer 17 and the reading on scale 24 when the bimetal temperature is 200° F. is readily apparent from FIG. 1. Similarly, it can be seen from FIG. 2 that at this temperature motor M is capable of carrying a load of 200 amps, which means that at the 50 amp load being carried it is indeed only 25 percent loaded.

Although substantial changes of load can and do often occur in a short interval of time, it naturally would be quite unusual, on the other hand, for the load current I to remain perfectly constant for as long a period as would usually be required for the ambient temperature to rise or fall 100°, and the foregoing illustrations merely represent hypothetical situations chosen to facilitate understanding of the basic mode of operation of our apparatus. In actual practice, changes of load current and of ambient temperature more often than not go on contemporaneously, one sometimes offsetting the other to a major or minor degree, and the two sometimes augmenting one another in either increasing or decreasing the effective loading of the electrical equipment under consideration. As a result, the reading on scale 24 continuously reflects the ultimate integrated effect of the two quantities, regardless of which one may be the dominating or controlling factor at any given time in producing a change of reading. So far as the specific numerical values used in FIGS. 1, 2 and 5 and the associated explanation are concerned, it should be understood, of course, that these are intended only to be illustrative and not limiting.

Because changes in the value of the load current I flowing in conductor 18 produce their effect on the position of pointer 17 by the heating or cooling of bimetal 15, the pointer will not respond to transients or brief fluctuations in the value of the current, and it therefore is quite unnecessary to provide any auxiliary damping arrangement. Moreover, in the event of a heavy current surge in line 18, our apparatus is well safeguarded by current transformer 20 which, because of its saturation characteristic (FIG. 3), automatically limits the output to a safe value.

While our invention is applicable to measuring the effective loading of motors, generators and has many, many other kindred applications, it is especially useful in maintaining under surveillance the extent to which various circuits and facilities in commercial power supply networks are taxed by the loading thereof, to the end that potential future overloading in periods of peak demand can be anticipated and appropriately guarded against.

It should perhaps be explained in this connection that the growing trend on the part of residential customers toward installing and using more and more high wattage appliances and intermittently operated "convenience" equipment is bringing about very pronounced changes in the shape of residential load curves, creating new and sometimes acute problems for utility companies. The increasing popularity of air conditioning affords a prime example. In the past, of course, periods of peak demand were created principally by customers' use of electric lights, whereby the peaks ordinarily occurred between nightfall and midnight, and were most pronounced in the winter evenings. In many areas this situation has undergone an almost complete reversal, and the air conditioning load has been by far the largest contributing factor. Major peaks now tend to occur in the hottest days of summer rather than in winter, and usually in the late afternoon rather than after the cool of nightfall. Unfortunately, in sections of the power supply network where this occurs, the distribution facilities are taxed most severely at or about the very time that, due to high ambient temperatures, their capability is lowest. Other factors such as the steadily increasing use of electric clothes dryers, water heaters, incinerators, etc., have also sometimes served to accentuate critical peaks to varying degrees in various segments of the network.

Generally speaking, it has been the distribution transformers, that is to say, the transformers where the last step-down of voltage occurs before reaching the customer's premises, that have suffered most from the brunt of these peaks. A typical metropolitan community of 250,000 customers usually will have approximately 45,000 distribution transformers scattered throughout its electrical distribution network, each serving a small group of customers and each located close to the group it serves. Maintaining adequate surveillance over the individual loading of the numerous distribution transformers in a given system in order to pick out those which are operating with too little margin of safety has not been feasible in the past because of the magnitude of the task, and because available means and methods were either unsatisfactory or prohibitively expensive.

However, this now can be accomplished simply, economically and reliably with the aid of our apparatus, and because it is exceptionally well suited to dealing with this acute problem it will be appropriate to describe a preferred practical embodiment of the invention with reference thereto. Attention therefore is directed to FIG. 6, which shows a typical pole-mounted distribution transformer 40 whose primary winding is connected by leads 42a and 42b to the high voltage alternating current supply line 44. The center tapped secondary winding of the transformer is connected by leads 46a, 46b and 46c to the three-wire low voltage feeder 48 which supplies power via various branch lines such as 49 to individual consumers' premises. Typically, a group of six to ten residential customers receive power in this fashion from the transformer. Between the center lead 46b and each of the outer leads, it may be assumed for convenience that the voltage is 115 v., as is standard in this country, whereby the voltage between the two outer leads 46a and 46c is double this value, i.e., 230 v.

Figure 6:
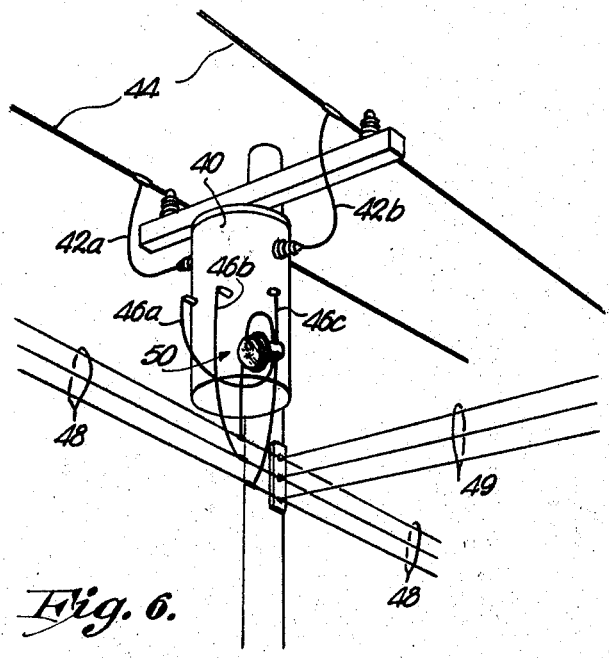
FIG. 6 is a perspective view showing a pole mounted distribution transformer having our improved measuring device or load indicator associated therewith.

The measuring device or indicator 50 of our invention can be associated with either the primary or secondary leads of the transformer, but we prefer to use the low voltage secondary leads. Accordingly the instrument is carried on the downwardly extending conductor 46c which, as best seen in FIGS. 7 and 8, passes through an opening or "eye" 52a in the supporting bracket 52. The other outer secondary conductor 46a is looped to pass upwardly through the same opening as indicated in FIG. 6.

Referring to FIGS. 7 and 8, the supporting bracket 52 is molded of suitable insulating material and has the laminated core 54 of our current transformer embedded therein so as to encircle the eye 52a. The core preferably is made of grain oriented cold rolled silicon steel strip material wound concentrically upon itself to form the cylindrical shape shown, the ends of the strip being secured by a wrap of insulating tape 56.

The secondary winding 58 of the current transformer is wound upon the core over this wrap and has its ends connected to screw studs 60 which are embedded in the molded support 52 so that they project outwardly from the diagonal face 52b at right angle thereto. In addition to serving as terminals for the current transformer winding, these studs are employed to physically connect and support the remaining components of our device on the bracket 52.

The latter bracket also has molded therein adjacent to the opening 52a a vertical fastener strip 62 whose curved end portions project above and below the bracket. Conductor 46c is bound tightly to these end extensions by means of ductile metal straps 54 wound about them as shown, or by any conventional type of clamp, whereby bracket 52 is suitably supported on conductor 46c. The portions of conductors 46a and 46c encircled by the core 54 act, of course, as the primary winding of the current transformer and it will be understood by those versed in the art that the inductive effect of the current in the two conductors is additive due to the manner in which conducor 46a is looped upwardly through the eye of the current transformer; referring to FIG. 8, in other words, the current in conductor 46a is always directionally the same and in phase with that in conductor 46c.

Attached to supporting bracket 52 is a housing 66 having a shallowly dished generally circular rear cover 68. Screw studs 60 extend through enlarged apertures in this cover, and the cover is secured in place by clamping nuts 70 on the studs; an insulating shoulder washer 71 under each nut serves to insulate the nut and stud from the cover as shown.

A circular face plate 72 made of insulating material is removably fastened to the marginal flange on the rear cover by means of circumferentially spaced screws 73. The margin of this assembly in turn seats just inside of the periphery of a transparent concavo-convex front cover 75, and the latter is held in place by circumferentially spaced set screws 76. The circular face plate 72 thus serves to divide the housing into a front compartment 77 and a rear compartment 78. All of the moving mechanical parts of the meter are mounted on this face plate.

Figure 10:
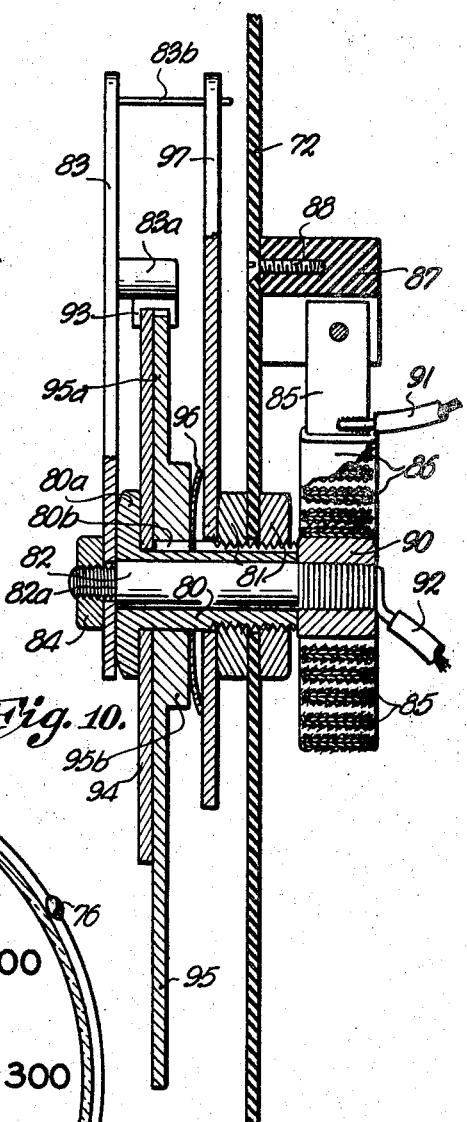
FIG. 10 is an enlarged cross section taken along the line 10—10 of FIG. 9 in the direction of the arrows.

Referring more particularly to FIGS. 8–10, inclusive, face plate 72 is centrally apertured to receive an externally threaded hollow bushing 80 which is secured to the face plate by a pair of clamping nuts 81 received on the bushing and tightened against opposite sides of the plate. Journaled in the hollow bore of this bushing is a short shaft 82 having at its forward end a threaded portion terminating in a shoulder 82a against which the apertured pointer 83 is clamped by means of nut 84. Torque for turning the shaft and its attached pointer 83 is supplied by the spiral bimetal element 85 which is encased throughout substantially its full length by a continuous sleeve of woven fiber glass insulation 86 that serves to keep adjacent turns of the spiral from bearing directly on one another (see FIGS. 9 and 10) as well as reducing the rate of heat radiation from the bimetal. The outermost extremity of the bimetal strip is received in and held stationary by a slotted anchor block 87 fastened to the rear of the face plate 72 by means of a screw 88. The innermost extremity of the spiral is secured by brazing, soldering or the like to a metal collar 90 which is screw threaded received on the rear end of shaft 82.

The inner and outer ends of the spiral bimetal strip are connected by flexible conductors 91, 92, respectively, to the terminals 60 of the current transformer secondary winding 58, whereby the electrical output of the transformer is caused to flow through the length of the bimetal strip. Due to the electrical resistance of the strip, the heat generated by this current flow causes the temperature of the bimetal to vary, increasing as the current value increases and decreasing with the reduction of current flow. If the current flow remains constant, the temperature of the bimetal also will remain constant provided there is no change in ambient temperature; however, if ambient temperature rises or falls, this will be reflected in the corresponding rise or fall of the bimetal temperature.

Figure 11:
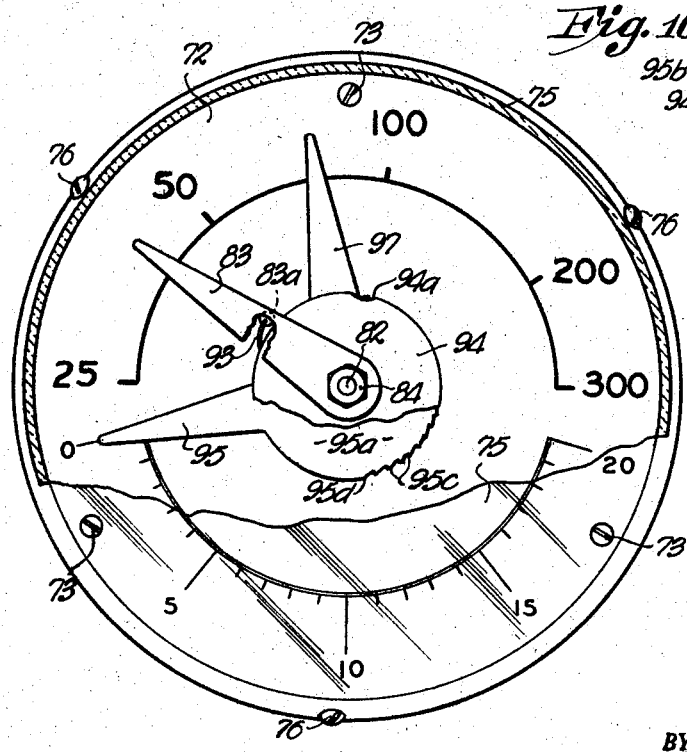
FIG. 11 is a front elevation of the face of our indicator, showing the pointers in approximate starting position.

The character of the bimetal strip employed in coil 85 is such that an increase in temperature tends to make the spiral unwind, while a temperature decrease has the opposite effect. Since the outer extremity of the bimetal coil is anchored so that it cannot move, a temperature increase of a given amount thus will cause collar 90 and shaft 82 to turn counterclockwise as seen in FIG. 9 (clockwise as seen in FIG. 11) advancing pointer 83 by an amount proportional to the temperature increase. Conversely, with the decrease of temperature, the bimetal coil will advance pointer 83 in a clockwise direction as seen in FIG. 9 (counterclockwise in FIG. 11) an amount proportional to the temperature decrease.

This action conforms, in other words, with what we have described in connection with FIG. 1. By its position with reference to the logarithmic scale laid out on the upper half of dial 72, pointer 83 always registers the percentage of the load-carrying capability of transformer 40 that is being utilized, as has also been explained. If at any given time the load on the transformer amounts to less than 25 percent of its capability, or more than 300 percent (situations which obviously will represent the exception rather than the rule in actual practice) no harm will be done to the instrument by pointer 83 traveling beyond the end readings. However, stop pins can be provided on dial 72 if desired to prevent the pointer from going "off scale" and thus limit its travel to the 25–300 percent range that is of interest.

As best seen in FIGS. 10 and 11, pointer 83 has a rearwardly projecting boss 83a carrying a small spring pawl 93 whose free end is tensioned to ride lightly on the margin of a stationary masking disc 94. The latter disc is centrally apertured and received on the bushing 80 immediately behind the bushing's enlarged head 80a. Also mounted on the bushing is a pointer 95 having a centrally apertured circular hub portion 95a with an integral annular spacing boss 95b on the rear thereof. Behind this boss and separated from it by a dished spring washer 96 is an apertured pointer 97 which bears against the face of the forward nut 81 as shown.

Bushing 80 contains a longitudinal keyway 80b which, as shown in FIG. 10, receives inwardly projecting lugs or keys on the disc 94 and the spring washer 96, respectively, so that neither the disc nor the washer can turn. Pointers 95 and 97 on the other hand are journaled for rotation on the bushing, but the axially applied pressure of spring washer 96 produces sufficient friction to hold them stationary except when torque is applied by pointer 83 as will now be explained.

Referring to FIG. 11, let it be assumed that due to an increase in ambient temperature and/or an increase in the electrical load carried by the distribution transformer 40 (FIG. 6), pointer 83 advances in a clockwise direction from the position shown. This will have no effect on either of the other pointers until pointer 83 reaches a position substantially overlying pointer 97. At that point, a slender pin 83b extending rearwardly from pointer 83 engages the edge of pointer 97, whereby continued clockwise travel of pointer 83 will cause pointer 97 also to advance at the same time due to the pushing action of pin 83b. This of course will continue until the temperature of the bimetal element 85 stops rising and begins to decrease. When this occurs, pointer 83 stops advancing in a clockwise direction and will begin a retrograde counterclockwise travel back toward the position shown in FIG. 11, leaving pointer 97 behind to mark the maximum extent of clockwise travel of pointer 83.

Thereafter, as the temperature of the bimetal element varies upwardly and downwardly pointer 83 may shift clockwise or counterclockwise any number of times, but until its clockwise travel on some occasion advances beyond the maximum marked by pointer 97 there will be no further movement of pointer 97. This pointer always serves, in other words, to mark the highest scale reading reached by pointer 83 in the course of clockwise travel on any occasion.

Pointer 95 is provided to count the number of times that distribution transformer 40 is overloaded, that is to say, the number of times that pointer 83 advances to a reading higher than "100" on the upper scale. Until this happens for the first time, not only will pointer 97 occupy a position below "100," as shown in FIG. 11, but also pointer 95 will occupy a position opposite the "0" reading on the scale provided on the lower half of dial 72, as shown.

Now, as previously mentioned, the spring pawl 93 carried by pointer 83 rides lightly on the margin of the stationary disc 94 in the course of movement of the pointer. Only when the pointer travels clockwise far enough to bring the pawl into the slight depression 94a in the margin of the disc—which will not occur unless and until pointer 83 advances beyond the "100" reading—will there be any movement of pointer 95.

The circular hub 95a of the latter pointer has ratchet teeth 95c whose tips are spaced slightly inward from the margin of disc 94 except in the region of the depression 94a. Accordingly the pawl 83 is normally maintained out of engagement with the ratchet teeth. Moreover, in advancing past the depression 94a, it will slide over the exposed teeth without producing any movement of pointer 95; upon retrograde (i.e., counterclockwise) movement of the pawl after passing depression 94a, however, it will engage one of the ratchet teeth and thus advance pointer 95 a predetermined amount in a counterclockwise direction before again being lifted by the disc 94 out of engagement with the ratchet tooth.

Pointer 95 therefore is advanced one step with reference to the scale in the lower half of dial 72 each time this action occurs, and it serves as a counter which registers the number of times that pointer 83 has traveled through the position established by the depression 94a, which according to FIG. 11 coincides with the "100" reading on the upper scale. If it is desired to change the angular position of pointer 83 at which this action will take place, such may easily be done by loosening one of the clamping nuts 81 so that the bushing 80 and disc 94 may be turned to adjust the position of depression 94a slightly clockwise or counterclockwise from that in which it is shown in FIG. 11. Thus, instead of counting the number of times a reading of "100" is exceeded by pointer 83, disc 94 can be adjusted so that a count will be kept of the number of times some other arbitrary value is exceeded. Also, this adjustment makes it possible to index the pointer 95 so that it will always stop accurately on one of the scale markings in the lower section of the face plate 72.

To avoid any possibility of pointer 95 advancing step by step far enough in a counterclockwise direction to enter the upper section of the dial, the ratchet teeth terminate at point 95d, and when this point reaches the region of depression 94a there can be no further engagement of pawl 93 with the ratchet teeth, hence no further advance of pointer 95.

Summarizing the action of the various pointers, the position of pointer 83 always reflects the temperature of the bimetal element 85 and, referring to FIG. 11, this pointer therefore advances clockwise with increases of temperature, counterclockwise with temperature decreases. The effective loading on distribution transformer 40 (FIG. 1) at any given time thus can be read on the upper scale, according to the position of pointer 83. Pointer 97 always marks the position of maximum clockwise displacement of pointer 83; it normally remains stationary, advancing with pointer 83 only when the latter is in the course of establishing a new maximum in clockwise displacement. The highest effective loading of transformer 40 at any past time therefore can be ascertained from the position of this pointer. Pointer 95 likewise is normally stationary but advances one step each time the clockwise displacement of pointer 83 exceeds a predetermined value established by the position of depression 94a; the number of steps pointer 95 has advanced thus is indicative of the number of times that this has occurred.

Generally speaking, distribution transformers such as 40 (FIG. 1) can stand higher degrees of overload for limited periods of time than can other types of electrical equipment such as motors, generators, etc. Nevertheless, for obvious reasons, utility companies in practice are considerably more concerned with having information on such overloading than in having specific information on loading which is far below the safe limit of its distribution transformers. These considerations are reflected in the choice of a 25–300 percent range to be covered by the instrument shown in FIG. 11, this being a matter of design choice, as we have already seen.

Although the limits of the effective loading scale which have been selected for the FIG. 11 instrument differ from those shown for the FIG. 1 instrument, it will be understood that the principles and formulae discussed in connection with FIG. 1 are equally applicable to the practical embodiment of our invention shown in FIGS. 5–11. Thus, for example, core 54 of the current transformer (FIGS. 7 and 8 preferably is saturable within the range of distribution transformer loads to be measured, the saturation characteristic being so designed as to produce, in conjunction with the bimetal 85, a response which properly matches the temperature/capability characteristic of the distribution transformer 40 with which the instrument is to be used, all as has been explained in connection with FIG. 1.

In most cases we find this can be accomplished by forming the current transformer's wound laminated core 54 of cold rolled, grain oriented silicon steel strip material of a single grade. However, to obtain the desired saturation characteristic in some instances, it is advantageous to use two or more grades of transformer steel strip material (that is to say grades having different excitation/flux characteristics), the two or more grades of strip material being interleaved in predetermined portions in the course of winding core 54 so as to form a core which is in effect a "blend" of different grades of steel.

Remembering that the distribution transformer 40 has a center tapped secondary winding from which the customers served by the transformer receive power, if the load on the two halves of this winding is reasonably well balanced, the portion on one half can be taken as an adequate index of the total load on the transformer. When this is true, it often will suffice if our instrument senses the load current in only one of the outer conductors 46a or 46c, rather than in both; in other words, assuming the instrument is mounted on the secondary lead 46c, as shown in FIGS. 6–8, lead 46a then need not be looped to pass through the eye 52a of the current transformer at all. However, since the output of the secondary winding 58 now will be governed by approximately half the value of load current that governs when the load in both conductors 46a and 46c in sensed, the transformation ratio of the current transformer and the specific saturation characteristic of its core naturally must be readjusted if the same order of readings is to be obtained despite halving of the measured load current of the distribution transformer 40. Nonetheless this is quite feasible in many cases.

Figure 12:
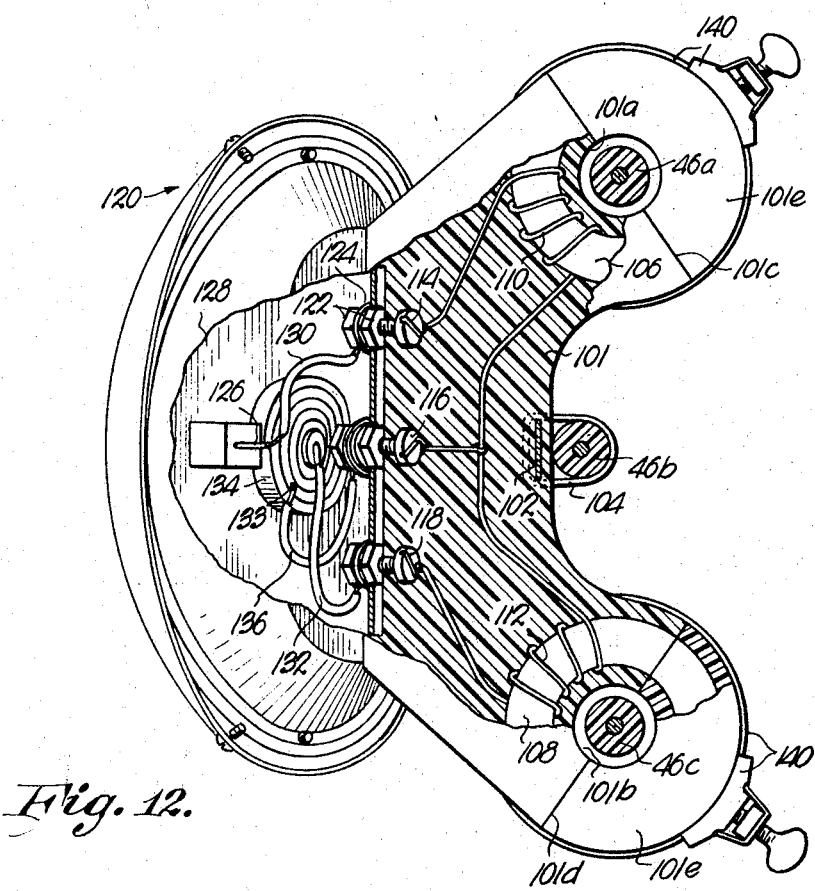
FIG. 12 is a plan view of a modified embodiment of our indicating device, parts being broken away for purposes of illustration.
Figure 13:
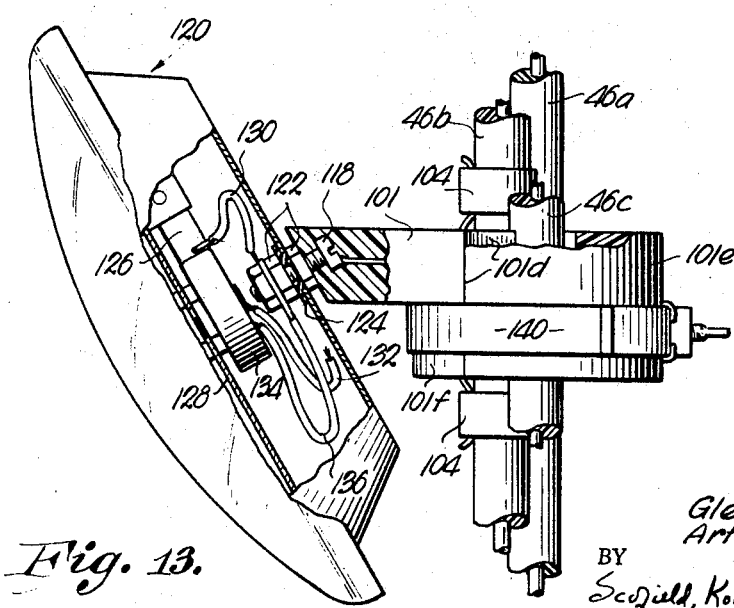
FIG. 13 is a side-elevational view of same with parts broken away for illustration.

On the other hand, it sometimes is advantageous not only to measure the load current in both conductors 46a and 46c, but also to sense the current in each one separately rather than by means of a single current transformer as is done in FIGS. 5–11. An arrangement for accomplishing this is shown in FIGS. 12 and 13.

Referring to the latter figures, the unit has a modified form of supporting bracket 101 formed of suitable insulating material. It is carried on the central conductor 46b by means of a vertical fastener strap 102 embedded centrally in the support, the ends of the strap being bound tightly to the conductor by suitable clamps such as 104. This is only for support of the unit, conductor 46b playing no part in its electrical operation.

Conductors 46a and 46c extend downwardly through apertures or eyes 101a and 101b provided at the outer ends of the molded support 101. Embedded therein so as to encircle the respective apertures are cores 106 and 108 of two current transformers, one having a secondary or output winding 110 and the other a corresponding winding 112. The two windings are connected to the embedded screw studs 114, 116 and 118 in the manner indicated in FIG. 12, which is to say that the windings are in series-additive relation between the outer studs 114 and 118, and that stud 116 is connected to a center tap between them.

The rear portion of the housing 120 has enlarged apertures to receive the projecting portions of the three studs and is secured thereto by means of nuts such as 122. However, the housing is electrically insulated therefrom by shoulder washers 124 made of insulating material.

The structural and mechanical arrangement of the apparatus within housing 120 is basically the same as that in FIGS. 6–11 and, as already described in connection with those figures, motive force for controlling the movement of all pointers is supplied by a spiral bimetal 126 mounted on the rear of face plate 128 in such a manner as to turn the control shaft which extends through the face plate in order to operate the mechanism on the forward side thereof. The only difference lies in the electrical connections made to the bimetal coil for the purpose of heating same.

As can be seen from FIG. 12, the inner and outer ends of bimetal coil 126 are connected by flexible conductors 130 and 132 to the terminal studs 114 and 118, respectively. In addition, at a point 133 which would be approximately midway between the two ends if the bimetal strip were unwound and laid out flat, the woven Fiberglas insulating sleeve 134 is opened up and a flexible conductor 136 is soldered to the bimetal element, the other end of this conductor being connected to the central terminal 116, as shown.

As a result, the output voltage induced in current transformer winding 110 is impressed on what may be regarded as the outer half of the spiral bimetal coil, while the output of winding 112 is impressed on the inner half. The fact that the inner turns of the coil may have a slightly different heat radiation characteristic than the outer turns and/or a slightly different deflection characteristic as regards turning the pointer shaft can be compensated for by offsetting point 133 slightly in one direction or the other from the exact midpoint of the bimetal strip; in other words, the electrical resistance effective in heating the bimetal can be made slightly greater from point 133 to one end of the coil than to the other end, and if this is done the characteristics of the current transformers associated with conductors 46a and 46c can be adjusted to match the differing resistances into which their respective outputs are fed.

Also, the latter transformers can be of a split-core type to permit installing our instrument without the interruption of electrical service that otherwise would be involved in threading conductors 46a and 46c through the eyes 101a and 101b. Thus, support 101 preferably is split along the diagonally disposed vertical planes 101c and 101d, so that each end portion 101e (including its embedded half of the current transformer core) is removable from the balance of support 101. When removed, conductors 46a and 46c need only to be bent or shifted laterally into the position shown, after which the end portions 101e can be replaced and fastened by means of clamping straps 140, each extending around the circular under body 101f at the end of the mounting support.

Needless to say, in the interest of economy and simplicity the support 101 can, if desired, comprise a single integral unit without the removable split-core feature just mentioned, especially in cases where no particular disadvantage is involved in threaded conductors 46a and 46c through the eyes 101a and 101b in an endwise direction. Conversely, the current transformer shown in FIGS. 7 and 8 can, if desired, be of the split-core type in cases where sidewise insertion of the conductor would offer a definite advantage from the standpoint of installation.

From the foregoing it will be seen that our invention is one well adapted to attain all of the ends and objects hereinbefore set forth, together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as various possible embodiments of the invention may be made without departing from the scope thereof, it is to be understood that all matter herein set forth or shown in the accompanying drawings is to be interpreted as illustrative and not in a limiting sense.

Having thus described our invention, we claim:

1. In combination with alternating current apparatus having an electrical line in which a variable load current flows depending on the load of said apparatus, the improvement which comprises means sensitive to the ambient temperature of said apparatus, said means comprising a thermal-mechanical transducer having a movable element whose position varies with temperature, and auxiliary means for so heating said transducer in accordance wtih the magnitude of said load current as to elevate the temperature of said transducer above ambient temperature by an amount substantially equal to $$a \log I$$

where $a$ is a constant and $I$ is the load current, said last means comprising a resistive electrical circuit and a current transformer inductively coupling said circuit with said line, said transformer having a core which is saturable under the influence of said load current.

2. Electric load measuring apparatus of the character described, comprising means for continuously sensing the magnitude of the load current, said means comprising a current transformer having a core which is saturable within the range of loads to be measured whereby the magnitude of the current output of said transformer has a nonlinear relation to the magnitude of the measured load, and a movable registering element controlled by the output current of said transformer to move substantially according to the formula $$D = a \log I$$

where D is the amount of displacement of said element from a predetermined position, $a$ is a constant, and I is the load current sensed by said transformer.

3. In combination with a variably loaded alternating current circuit, load measuring apparatus comprising a current transformer coupled with said circuit for sensing the load current therein, an electrical resistance element connected to the output winding of said transformer to receive the output current thereof, said transformer having a core which is saturable within the range of loads to be measured whereby the output current fed to said resistance element varies in such nonlinear relation to the load current in said circuit that the temperature of said element at all times exceeds ambient temperature by an amount substantially equal to $$a \log I$$

where $a$ is constant and I is the load current in said circuit, and a register variably controlled by said element in accordance with the temperature thereof.

4. In combination with a variably loaded alternating current circuit, load measuring apparatus having a current transformer coupled with said circuit for sensing the load current therein, a movable member, a bimetal strip sensitive to ambient temperature and mechanically coupled with said member to adjust the position thereof in accordance with temperature changes, means connecting the ends of the output winding of said transformer to said bimetal strip at spaced apart points thereon to produce a flow of heating current in said strip, and said current transformer having a core which is saturable within the range of loads to be measured whereby the magnitude of said heating current varies in nonlinear relation to the magnitude of the load current in said circuit.

5. A combination as in claim 4 having a flexible sleeve of insulating material encircling said bimetal strip in the region between said spaced-apart points.

6. A combination as in claim 4, wherein said load measuring apparatus has a response characteristic such that said member moves substantially according to the formula $$D = C\left[\frac{\log I_x - \log I}{\log I_y - \log I_x} + \frac{T_x - T}{T_x - T_y}\right]$$

where D is the amount of displacement of said member from a predetermined position, C is a constant, I is the load current in said circuit, T is the ambient temperature, $I_x$ is the full load current capability of said circuit at ambient temperature $T_x$, and $I_y$ is the full load current capability of said circuit at ambient temperature $T_y$.

7. Electric load measuring apparatus of the character described, comprising means for continuously sensing the magnitude of the load current, means for continuously sensing ambient temperature, continuously variable registering means controlled jointly by said two sensing means to register the quantity D at all times substantially according to the formula $$D = a \log I + bT - c$$

where $a$, $b$ and $c$ are constants, I is the load current and T is the ambient temperature.

8. Electric load measuring apparatus of the character described, comprising means for continuously sensing the magnitude of the load current, means for continuously sensing ambient temperature, a counting register, and means controlled jointly by said two sensing means for advancing said register each time the quantity $$a \log I + bT - c$$

exceeds a predetermined value, where $a$, $b$ and $c$ are constants, I is the load current and T is the ambient temperature.

9. In combination with variably loaded electric apparatus having a load-carrying capability of $I_x$ when operating at an ambient temperature of $T_x$ and a load-carrying capability of $I_y$ when operating at an ambient temperature of $T_y$, means for continuously sensing the load current (I) of said apparatus, means for continuously sensing the ambient temperature (T), a movable member controlled jointly by said two sensing means substantially according to the formula $$D = a \log I + bT - c$$

where $a$, $b$ and $c$ are constants and D is the displacement of said member from a predetermined position, and a registering indicator variably controlled by said movable member in accordance with the position thereof to indicate, for each position, a value substantially equal to $$kI\left[\frac{I_x}{I_y}\right]^{\frac{T_x - T}{T_x - T_y}}$$

where $k$ is a constant.

10. In combination with variably loaded electric apparatus having a load-carrying capability of $I_x$ when operating at an ambient temperature of $T_x$ and a load-carrying capability of $I_y$ when operating at an ambient temperature of $T_y$, means for sensing the load current (I) of said apparatus, means for concurrently sensing the ambient temperature (T), and a movable element controlled jointly by said two sensing means to move variably between and positions $P_a$ and $P_b$ substantially in accordance with the formula $$D = A - \frac{D_m}{B}\left[\frac{\log I_x - \log I}{\log I_y - \log I_x} + \frac{T_x - T}{T_x - T_y}\right]$$

where D is the displacement of said element from position $P_a$, $D_m$ is the total distance between end positions $P_a$ and $P_b$, and A and B are constants, the value of B being within the range of 2 to 6.

11. In combination with variably loaded electric apparatus having a load-carrying capability of $I_x$ when operating at an ambient temperature of $T_x$ and a load carrying capability of $I_y$ when operating at ambient temperature of $T_y$, means for sensing the load current (I) of said apparatus, means for concurrently sensing the ambient temperature (T), and a movable element controlled jointly by said two sensing means substantially in accordance with the formula $$D = C\left[\frac{\log I_x - \log I}{\log I_y - \log I_x} + \frac{T_x - T}{T_x - T_y}\right]$$

where C is a constant D is the displacement of said element from a predetermined position.

12. A load indicator comprising a housing, a rotary shaft journaled in said housing, a spiral bimetal strip in said housing having one end connected to said shaft, means anchoring the other end of said strip whereby said strip is effective to turn said shaft in one direction as its temperature increases and in the opposite direction as its temperature decreases, a support for said housing comprising an insulator secured to the exterior thereof and containing a pair of laterally spaced apertures for receiving the conductors of a power line, means for varying the temperature of said bimetal strip in accordance with variations in the load on said power line, said last means comprising a pair of current transformers each having an annular core embedded in said insulator in a position encircling a different one of said apertures, one transformer output winding having its ends connected to spaced apart points on said strip to produce a flow of heating current in one section of the strip, and the other transformer output winding having its ends connected to other spaced apart points on said strip to produce a flow of heating current in a different section of the strip.

13. In a load indicator of the character described, a housing, a support for the housing comprising an insulator secured to the exterior thereof and containing an aperture for receiving a power line conductor, a load sensing current transformer embedded in said insulator in a position such that the core of said transformer encircles said aperture, a rotary shaft journaled in said housing, means in the housing controlled by the current output of said transformer for varying the angular position of said shaft in accordance with the magnitude of said current output, a circular ratchet member journaled to turn co-axially with said shaft, a pawl carried by said shaft in cooperative relation with said ratchet member, and masking means maintaining said pawl out of engagement with said ratchet member at all times except when said shaft is in a particular rotary position, whereby said member is advanced by said pawl each time said shaft advances through said particular position.

14. In a load indicator of the character described, a housing, a support for said housing comprising an insulator secured to the exterior thereof and containing an aperture for receiving a power line conductor, a load sensing current transformer within said insulator in a position such that the core of said transformer encircles said aperture, said core being saturable within the range of loads to be measured whereby the output of said transformer has a nonlinear relation to the magnitude of the load sensed by said transformer, a rotary shaft journaled in said housing, and means in said housing controlled jointly by the output of said transformer and by the ambient temperature of said housing for varying the angular position of said shaft substantially according to the formula $$D = a \log I + bT - c$$

where D is the angular displacement of said shaft from a predetermined position, $a$, $b$ and $c$ are constants, I is the power line load current acting on said transformer and T is the ambient temperature of said housing.

15. A load indicator comprising an insulator having a pair of terminals on the exterior thereof, said insulator also having an aperture for receiving a power line conductor, a load sensing transformer embedded in said insulator in a position such that the core of said transformer encircles said aperture, conductors within said insulator connecting the output winding of said transformer to said terminals, a meter having a housing secured to said insulator, said housing being apertured to receive said terminals, a rotary shaft journaled in said housing, a spiral bimetal strip in said housing having one end connected to said shaft, means anchoring the other end of said strip whereby said strip is effective to turn said shaft in one direction as its temperature increases and in the opposite direction as its temperature decreases, means within said housing electrically connecting said terminals to spaced-apart points on said strip whereby a flow of heating current is produced in said strip by the output of said transformer, and a flexible sleeve of thermal insulating material encircling said strip in the region between said space-apart points.

16. A load indicator as in claim 13, wherein the core of said load sensing transformer is saturable within the range of loads to be measured.

17. In combination with alternating current apparatus having an electrical line in which a variable load current flows depending on the load of said apparatus, the improvement which comprises a movable register controlled jointly by said load current and by the ambient temperature of said apparatus, said register having a substantially linear response to changes in said ambient temperature and a substantially logarithmic response to changes in said load current.

18. A combination as in claim 17, wherein said register has a logarithmic read-out scale.

References Cited

UNITED STATES PATENTS

| | | | |
|---|---|---|---|
| 336,133 | 2/1886 | Mott | 324—106 |
| 1,904,096 | 4/1933 | St. Clair | 324—117 |
| 2,053,944 | 9/1936 | Cooney | 200—140 X |
| 2,157,006 | 5/1939 | Oesinghaus | 324—132 X |
| 2,165,290 | 7/1939 | Mitchell | 324—127 |
| 2,313,758 | 3/1943 | Matthews | 324—104 |
| 2,326,909 | 8/1943 | Wolferz | 324—127 X |
| 2,345,028 | 3/1944 | Bradshaw | 324—104 |
| 2,351,983 | 6/1944 | Leonard | 340—419 |
| 2,385,044 | 9/1945 | Vassar | 324—106 |
| 2,492,011 | 12/1949 | Smith | 324—103 |
| 2,704,841 | 3/1955 | Van Ryan | 73—350 |
| 2,892,169 | 6/1959 | Teague et al. | 336—213 |
| 3,074,039 | 1/1963 | Ford | 336—213 |
| 3,077,777 | 2/1963 | Book | 73—350 |

RUDOLPH V. ROLINEC, *Primary Examiner.*

E. KARLSEN, *Assistant Examiner.*